United States Patent
Virzi (10) Patent No.: US 8,982,103 B2
(45) Date of Patent: Mar. 17, 2015

(54) METHOD FOR DETERMINING THE POSITION OF A CONTACT ON A TOUCH PANEL AND CORRESPONDING SYSTEM

(75) Inventor: Maria Celvisia Grazia Virzi, Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 1020 days.

(21) Appl. No.: 12/912,404

(22) Filed: Oct. 26, 2010

(65) Prior Publication Data

US 2011/0096037 A1    Apr. 28, 2011

(30) Foreign Application Priority Data

Oct. 27, 2009 (IT) ............................. TO2009A0823

(51) Int. Cl.
*G06F 3/043*    (2006.01)
(52) U.S. Cl.
CPC ................................. *G06F 3/0433* (2013.01)
USPC ........................................................ 345/177
(58) Field of Classification Search
CPC combination set(s) only.
See application file for complete search history.

(56) References Cited

U.S. PATENT DOCUMENTS

| | | | |
|---|---|---|---|
| 4,511,760 | A | 4/1985 | Garwin et al. |
| 4,918,262 | A | 4/1990 | Flowers et al. |
| 2002/0135570 | A1 | 9/2002 | Iisaka et al. |
| 2006/0064013 | A1 | 3/2006 | Ake et al. |
| 2006/0192763 | A1 | 8/2006 | Ziemkowski |
| 2009/0140996 | A1* | 6/2009 | Takashima et al. ........... 345/173 |

FOREIGN PATENT DOCUMENTS

| | | |
|---|---|---|
| EP | 0859334 | 8/1998 |
| EP | 1798635 | 6/2007 |
| EP | 1852772 | 7/2007 |
| EP | 2012222 | 1/2009 |
| GB | 2168004 | 6/1986 |

(Continued)

OTHER PUBLICATIONS

European Search Report for European Application No. EP10188914, European Patent Office, Berlin, May 5, 2011, pp. 4.

(Continued)

*Primary Examiner* — Amr Awad
*Assistant Examiner* — Andre Matthews
(74) *Attorney, Agent, or Firm* — Allen, Dyer, Doppelt, Milbrath & Gilchrist, P.A.

(57) ABSTRACT

A method for determining the position of a contact on a panel envisages, during a detection operation, detecting vibration signals at a plurality of detection areas fixed with respect to the panel as a function of vibrations generated by the contact; determining detection values of temporal differences between times of detection of the vibrations at pairs of said detection areas; and determining the position of the contact as a function of said temporal differences. A characterization operation, preceding that of detection, envisages defining contact areas (key1-keyn) on the panel and associating to these contact areas respective ranges of admissible values for the temporal differences. In order to determine the position of the contact in a given contact area, the membership of the detection values of the temporal differences to the respective ranges of admissible values of the given contact area is verified. The method moreover envisages implementation of an algorithm for reconstruction and filtering of crossing signals, originated by the comparison of the vibration signals with one or more threshold values.

13 Claims, 5 Drawing Sheets

(56) References Cited

FOREIGN PATENT DOCUMENTS

| WO | 2007017515 | | 2/2007 |
|---|---|---|---|
| WO | WO 2007/017515 | * | 2/2007 |

OTHER PUBLICATIONS

Search Report based on Italian Application Serial No. TO20090823, Ministero dello Sviluppo Economico, Berlin, May 27, 2010, pp. 3.

* cited by examiner

METHOD FOR DETERMINING THE POSITION OF A CONTACT ON A TOUCH PANEL AND CORRESPONDING SYSTEM

PRIORITY CLAIM

The instant application claims priority to Italian Patent Application No. TO2009A000823, filed Oct. 27, 2009, which application is incorporated herein by reference in its entirety.

TECHNICAL FIELD

An embodiment relates to a method for determining the position of a contact on a touch panel, and to a corresponding system for determining the position of a contact.

BACKGROUND

By the terms "touch panel", or more simply (as will also be used hereinafter) "panel", is meant, in the context of the present disclosure, a generically rigid element, which is designed to be touched by a user (with a finger, a hand, or via an object), having any shape and dimension and made of any material such as to enable propagation of vibrations.

As is known, the use is growing of electronic devices envisaging touch panels as interface tool for facilitating and making more immediate data input by a user.

In these electronic devices, the user is able to activate given functions via a simple physical contact on given points or areas of contact of the corresponding panel. The contact may be generated directly by the user touching with his/hers finger or hand, or else may occur via a purposely provided data-input device.

In particular, by "touch" is herein understood a tap or impact of any kind that is able to produce vibrations on the panel, the latter being made of suitable rigid material that may enable propagation of the vibrations generated by the touch.

Appropriate methods and systems are envisaged for determining the touch position on the touch panel, and causing the consequent activation of corresponding functions in the electronic device.

SUMMARY

The systems most commonly used for determining the position of contact are based principally upon three technologies: capacitive, resistive, and ultrasound technologies. In any case, manufacturing of these systems may require additional complex steps in the process for manufacture of the electronic devices, with considerable repercussions on the overall manufacturing cost.

In brief, in the case of capacitive technology, a matrix of electrostatic capacitors is associated with the touch panel; the matrix is constituted by electrodes made of, for example, transparent metal material (for example, ITO—Indium Tin Oxide) in such a way as not to be evident to the user. Physical contact on the panel determines a local variation of the value of capacitance in the area in which contact has occurred; an electronic circuit detects this capacitance variation, and determines the contact position as a function thereof.

Resistive technology envisages formation of a matrix of metal wires, the value of resistance of which is altered by the contact on the panel; the matrix of metal wires is in general visible to the naked eye.

Ultrasound technology envisages, instead, generation of surface acoustic waves with a frequency of a few tens of megahertz, which distribute with a given pattern over the surface of the touch panel. Physical contact determines a local variation of this pattern, from which it is possible, using appropriate algorithms, to determine the position in which contact has occurred. The acoustic waves are in general generated by a first set of piezoelectric transducers, whilst a second set of piezoelectric transducers, situated in appropriate positions of the touch panel, detects the pattern of acoustic waves and its alterations. This embodiment, unlike the previous ones, is of an active type, and may require continuous generation of a pattern of acoustic waves on the surface of the touch panel, with consequent usage of energy.

In patent application WO2007017515, which is incorporated by reference, a different system for determining the position of a contact on a touch panel has been proposed.

This system envisages the use of a plurality of vibration sensors (in particular, MEMS—Micro-Electro-Mechanical System—accelerometer sensors), in a number equal to or greater than three, rigidly coupled to the panel and configured to detect the vibrations that are generated due to a touch by the user and propagate through the panel. A purposely provided electronic circuit receives the vibration signals detected by the sensors and is configured to determine the position of contact with an algorithm based upon the processing of time-of-flight differences, where by "time of flight" is meant the time of arrival of the vibration pattern generated by the contact in a region corresponding to the various vibration sensors (or, in a similar way, the time for detection of the vibration pattern by the vibration sensors).

In detail, assuming that the touch panel is substantially homogeneous and that consequently vibrations propagate in all directions with a same speed, differences of distance between the position of the contact and the (known) positions of the various vibration sensors correspond to the differences of times of flight. In particular, to each time-of-flight difference, determined starting from the signals detected by a given pair of vibration sensors, a hyperbola may be associated, having as foci the positions of the two considered vibration sensors (the hyperbola is in fact, by definition, the locus of the points such that the difference of the distances to the two foci is constant). The points of the hyperbola are equivalent as regards the time of flight, i.e., they give rise to a same temporal difference between the times of detection of the mechanical vibrations by the vibration sensors of the pair. By using at least three non-aligned sensors, and determining the point of intersection between the hyperbolas associated with the three time-of-flight differences, it is possible, at least from a theoretical standpoint, to determine the position of the point of contact. The vibration sensors may also be positioned in such a way as to be able to reject one of the two intersections, which falls always outside the surface of the touch panel; alternatively, by using a number of pairs of vibration sensors, it is possible to obtain a single intersection and hence avoid any further processing.

Figure 1:
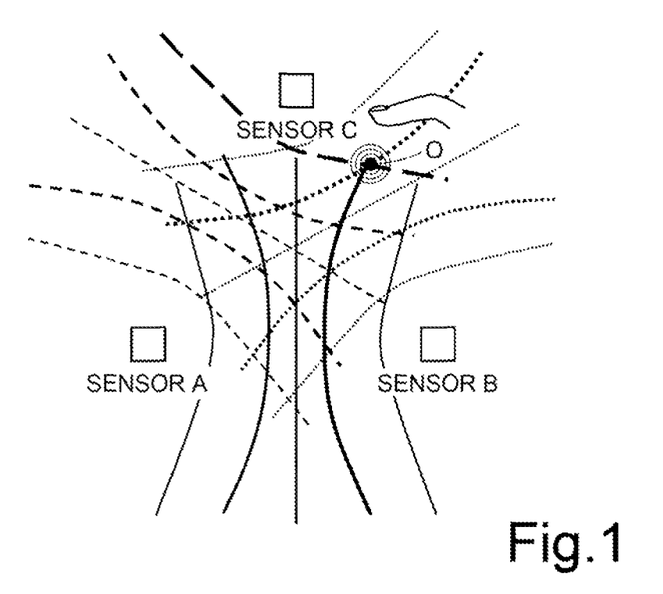
FIG. 1 is a schematic representation of an embodiment of an algorithm of a known type for determining the position of a contact on a touch panel.

The algorithm described previously is exemplified in the schematic representation of FIG. 1, where the vibration sensors (three in number) rigidly coupled to a touch panel are designated by A, B and C, and the position of contact is designated by O. As may be seen in this FIG. 1, the position of contact O is located at the intersection between three particular hyperbolas having their foci in the position of the vibration sensors of a corresponding pair.

It has been verified that an algorithm of this kind is not always of immediate practical application, and does not allow, at least in given conditions, a proper determination of the position of contact. In particular, this algorithm may not enable, in general, determination with a sufficient degree of precision of the position of the contact in the case where the panel is not homogeneous or has an irregular and non-uniform surface geometry.

It has moreover been realized that, frequently, the very determination of the instant of arrival of the vibration pattern at the various vibration sensors (the time of flight) is problematical due to the presence of noise (understood as disturbance of various natures).

In particular, a threshold comparator is generally used for determination of the time of flight; the comparator is designed to compare the electrical signal (normally a voltage signal) generated by each vibration sensor with a given threshold (that is the same for all the vibration sensors). Crossing (either upwards or downwards) of the threshold by the signal, caused by the oscillations associated with the vibration patterns with respect to the situation at rest is used for determining the arrival of the vibrations at the sensor.

It has, however, been realized that a detection algorithm of this kind may be subject to errors, in the presence of disturbances of various natures: either mechanical, for example reflected waves; or electrical, for example electrical noise on the output signals of the vibration sensors. According to the conditions in which it occurs, for example in terms of the characteristics of the touch panel (shape, geometrical dimensions, material of which is made, etc.) or of the characteristics of the touch (contacts of different intensity by the user, an impact by a rigid object, etc.), this disturbance may generate errors in the detection of the time-of-flight differences, and consequently in the detection of the contact position.

An embodiment solves the problems highlighted previously, and, moreover, provides an alternative for determination of the position of contact on a touch panel.

BRIEF DESCRIPTION OF THE DRAWINGS

For a better understanding of the present disclosure, one or more embodiments are now described, purely by way of non-limiting example and with reference to the attached drawings, wherein.

DETAILED DESCRIPTION

Figure 2:
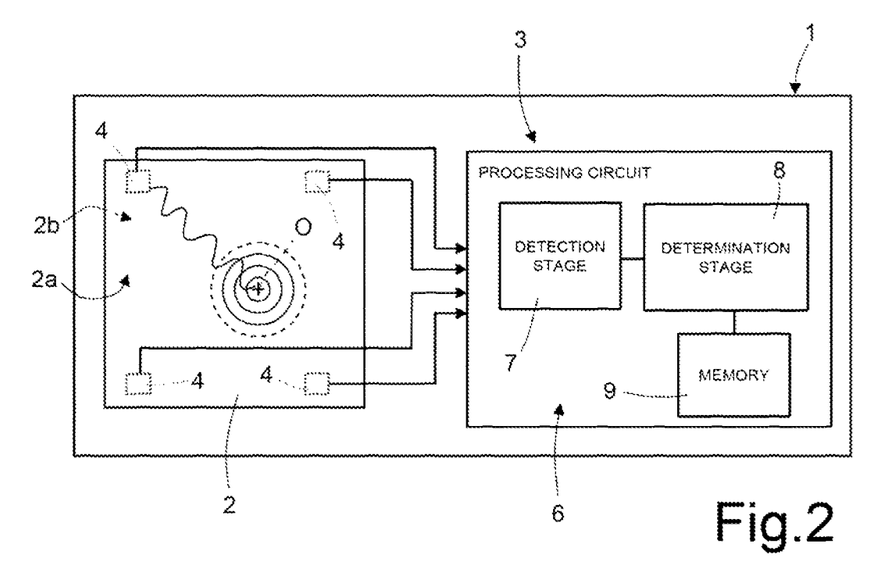
FIG. 2 is a schematic depiction of an embodiment of an electronic device provided with a touch panel and a system for determining the position of a contact on the panel.

FIG. 2 is a schematic depiction of an embodiment of an electronic device 1 including a touch panel (hereinafter panel) 2, designed to be used by a user as a generic tool for input (for example, of data, commands, or selections), and a contact position determining system 3, configured to determine the position of a physical contact on the panel.

The panel 2 is made of rigid material, for example glass, wood or plastic, and, for example, has a homogeneous, not necessarily planar, surface of contact and mechanical characteristics such as to enable propagation of mechanical vibrations in an isotropic manner (i.e., irrespective of the direction of propagation). The panel 2 may be fixed to any support, by means of a purposely provided frame. Keys, or touch or contact areas (or similar elements of interaction with the user), may be defined on one or both of the outer or inner surfaces (designated by 2a and 2b in FIG. 2) of the panel 2, for example by means of adhesive film, incisions, or application of graphic signs. Alternatively, in the case of use with a display screen, the panel 2 may be transparent, and the keys, or contact areas, are defined by means of visualizations generated on the underlying screen (in the form of icons, menus, or other graphic signs).

The contact position determining system 3 comprises a plurality of vibration sensors 4, for example, accelerometer sensors made with MEMS technology, coupled in a rigid and fixed way with respect to the panel 2, for example on the inner surface 2b (or alternatively on the outer surface 2a or on both surfaces), and designed to detect the vibrations generated by a contact on the panel 2 at a contact position O (a contact that may be caused by the user touching with his/hers finger or hand, or by any other object) and to generate corresponding vibration signals (electrical signals, the value of which is a function of the magnitude of the vibrations detected). The mechanical vibration pattern (illustrated schematically for just one sensor) propagates, for example, with a constant speed starting from the contact position O, equivalently in all directions (if the panel 2 is assumed to be isotropic). In an embodiment, the vibration sensors 4 are not less than three in number.

The contact position determining system 3 further comprises a processing circuit 6, of an electronic type, electrically connected to the vibration sensors 4. In particular, the processing circuit 6 comprises: a detection stage 7, which receives the vibration signals generated by the vibration sensors 4, processes them by means of appropriate amplification and filtering, and compares them with one or more appropriate thresholds (as described in detail hereinafter, in order to enable detection of the arrival of the vibrations generated by touch at the vibration sensors 4); and a determination stage 8, for example implemented by a microprocessor or microcontroller, connected to the output of the detection stage 7, and designed to determine the time-of-flight differences $\Delta tf$ (i.e., temporal differences between the times of arrival of the vibrations generated by touch in a region corresponding to pairs of vibration sensors 4) and identify the position of the contact on the panel 2 as a function of the time-of-flight differences $\Delta tf$ thus determined.

The (outer or inner) contact surface of the panel 2 may be divided into a plurality of contact areas, each of which represents a virtual key, the pressure on which exerted by the user is to be recognized. The determination stage 8 is in this case configured so as to assign to the contact that is each time detected one of these contact areas so as to determine the virtual key that has been pressed (and thus enable activation of corresponding functions in the electronic device 1).

The processing circuit 6 further comprises a memory 9, of any known type, for example of a RAM type, operatively connected to the determination stage 8 (the contents and function of the memory 9 will be clarified in what follows).

It has been determined, by conducting numerous experimental tests, that the time-of-flight differences Δtf associated with the touch on a given contact area of the panel 2 remain practically constant in successive contacts. The variations that occur are due, for example, to the fact that the contact area is not pointlike but has an extension corresponding to the "object" that has produced the vibration (pen, finger or palm of the user's hand, etc.), and moreover to the variations in the vibration signals as a function of the characteristics of the same object (for example, in terms of its stiffness).

Therefore, one may associate to each of the contact areas on the panel 2 respective ranges of admissible values for the time-of-flight differences Δtf of the various pairs of vibration sensors 4.

These ranges of values may be determined experimentally in a step of characterization of the system and may be stored within the memory 9. The determination stage 8 in this case may be configured so as to identify the position of the contact in that contact area the associated range of values of which is satisfied by the time-of-flight differences each time detected.

An embodiment envisages use of a plurality of thresholds for determining the times of arrival of the vibrations at the vibration sensors 4, and of the corresponding time-of-flight differences Δtf.

Figure 3:
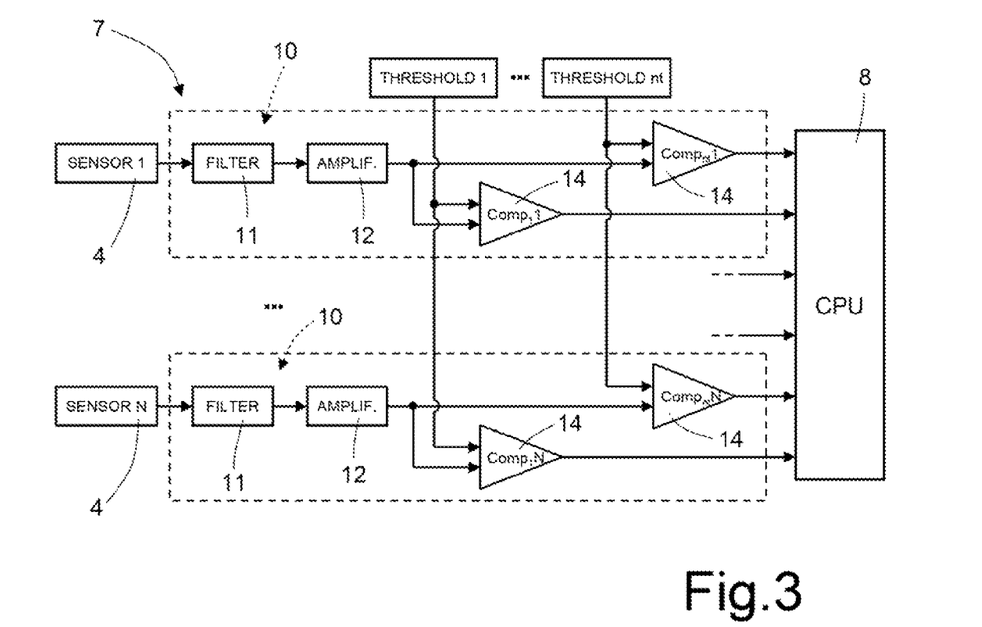
FIG. 3 is a block diagram of an embodiment of a detection stage of the contact position determining system.

A simplified block diagram of the detection stage 7 is illustrated in FIG. 3, in the case a number nt of thresholds (greater than or equal to two), in common between the various vibration sensors 4, is used (note that the scheme described may be implemented with analog components, or in a digital way within the firmware of the same microprocessor or microcontroller that implements also the determination stage 8).

The detection stage 7 comprises a number of circuit branches 10 equal to the number of the vibration sensors 4, each circuit branch 10 receiving at input the vibration signals detected by a corresponding vibration sensor 4. Each circuit branch 10 is formed by: a filtering unit 11, which filters the vibration signal acquired by the corresponding vibration sensor 4 to eliminate the components of noise outside a band of interest; an amplification unit 12, cascaded to the filtering unit 11, which amplifies the filtered vibration signal, as a function of a desired sensitivity; a plurality of threshold comparators 14, one for each of the thresholds (and hence in number equal to nt), each of which compares the filtered and amplified vibration signal with a respective threshold and supplies at output a crossing signal, indicating crossing of the threshold, upwards or downwards, by the vibration signal (each crossing signal is hence constituted by a train of pulses of variable duration, the edges of which correspond to crossing of the threshold).

The various crossing signals, equal in number to the vibration sensors 4 multiplied by the number nt of the thresholds, are then sent to the determination stage 8 (in this example, implemented by a microcontroller) in order to determine the time-of-flight differences Δtf and, consequently, the position of the contact.

Figure 4:
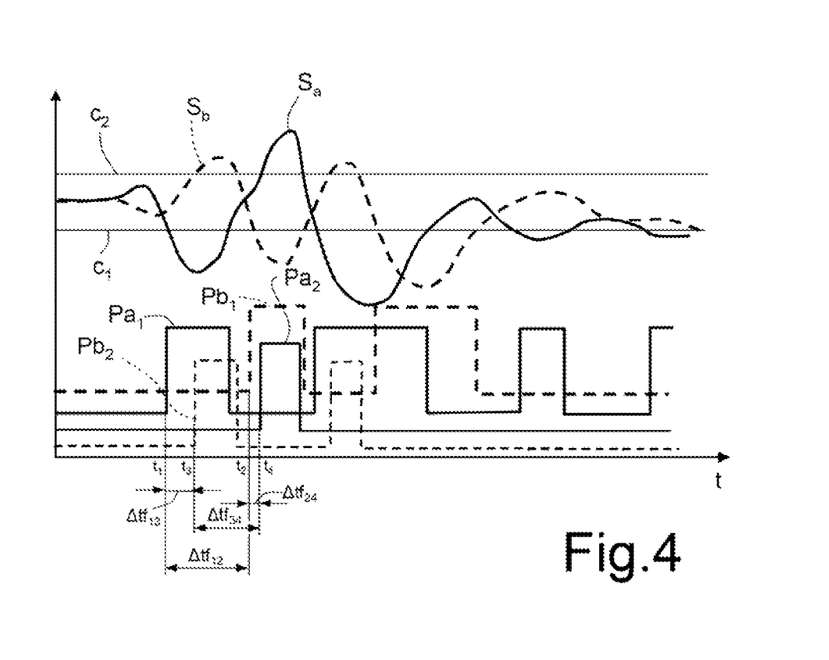
FIG. 4 shows a pattern of signals associated with an embodiment of a contact position determining system.

FIG. 4 shows, by way of example, two vibration signals (detected by two of the vibration sensors 4 of the contact position determining system 3), designated by $S_a$ and $S_b$; designated by $c_1$ and $c_2$ ($c_1 < c_2$) in the same FIG. 4 are two thresholds, with which the vibration signals $S_a$ and $S_b$ are compared. Note that the thresholds $c_1$, $c_2$ have values respectively below and above a level at rest of the vibration signal (in the absence of a contact).

In particular, following upon comparison (by a respective threshold comparator 14) of the vibration signal $S_a$ with the threshold $c_1$, a crossing signal $P_{a1}$ is generated; following upon comparison of the vibration signal $S_a$ with the threshold $c_2$, a crossing signal $P_{a2}$ is generated; following upon comparison of the vibration signal $S_b$ with the threshold $c_1$, a crossing signal $P_{b1}$ is generated; and following upon comparison of the vibration signal $S_b$ with the threshold $c_2$, a crossing signal $P_{b2}$ is generated. In the example of FIG. 4, crossing downwards of the threshold $c_1$ determines switching to a high value of the respective crossing signals $P_{a1}$, $P_{b1}$, whilst crossing upwards of the threshold $c_2$ determines switching to a high value of the respective crossing signals $P_{a2}$, $P_{b2}$ (note that other conventions for detecting crossing of the thresholds and generation of the crossing signals, may be applied).

On the basis of the aforesaid crossing signals, the determination stage 8 determines the following time-of-flight differences Δtf (see FIG. 4):

$\Delta tf_{12} = t_2 - t_1$: time-of-flight difference for the crossing signals $P_{b1}$, $P_{a1}$, both referred to threshold $c_1$;

$\Delta tf_{34} = t_4 - t_3$: time-of-flight difference for the crossing signals $P_{a2}$, $P_{b2}$, both referred to threshold $c_2$;

$\Delta tf_{13} = t_3 - t_1$: time-of-flight difference for the crossing signal $P_{b2}$, referred to threshold $c_2$, and for the crossing signal $P_{a1}$, referred to threshold $c_1$; and $\Delta tf_{24} = t_4 - t_2$: time-of-flight difference for the crossing signal $P_{a2}$, referred to threshold $c_2$, and for the crossing signal $P_{b1}$, referred to threshold $c_1$.

The time-of-flight differences Δtf are referred to crossing signals associated to different vibration sensors 4 (for example, the temporal difference $t_4 - t_1$ does not represent a time-of-flight difference); moreover, for determination of the time-of-flight differences Δtf, the first significant crossing, whether upwards or downwards, of the thresholds is considered (as will be described more fully hereinafter), and hence the first edge of the corresponding crossing signals.

For each pair of vibration sensors 4, in this way a wide range of time-of-flight differences Δtf (according to the number of the thresholds considered) may be defined. In general, considering a generic number nt of thresholds and a generic number N of vibration sensors 4, coupled to the panel 2, it is possible to define the following time-of-flight differences Δtf:

$$\Delta tf_{mnij} = t_{mi} - t_{nj} \ m, n = 1, \ldots N \text{ with } m \neq n \ i, j = 1, \ldots nt$$

where the time $t_{mi}$ is the instant at which the crossing signal referred to the m-th vibration signal $S_m$ and to i-th threshold has the first significant edge (and first significant pulse).

It may be verified that the total number of time-of-flight differences thus determined is given by:

$$\Delta T_{N,nt} = nt^2 \binom{N}{2}$$

It has been realized, from numerous experimental tests, that in order to recognize each contact area on the panel 2, it may be sufficient to consider only a certain subset of time-of-flight differences, with respect to the total number $\Delta T_{N,nt}$ (the number of time-of-flight differences in the subset, depending, among other things, upon the number of contact areas to be recognized, their position, and the geometry of the panel surface).

In fact, it has been verified that, if a wide range of touches are made on one and the same contact area, and each time the time-of-flight differences $\Delta T_{N,nt}$ are determined, only some of them remain substantially constant for the successive contacts (in particular, remaining within a range of values that may be determined experimentally beforehand), whilst the others do not have a constant trend, but show, instead, significant variations between the contacts.

Consequently, it has been found that it is sufficient to consider for determination of a contact on each contact area only the time-of-flight differences Δtf that remain substantially constant (constituting a subset of the time-of-flight differences for that given contact area), whilst the others may be neglected.

As previously discussed, the variability within the respective range of values of the time-of-flight differences Δtf belonging to a given subset may be attributed, among other things, to the non-pointlike nature of the contact area and to the not perfectly identical characteristics of the various touches on the panel 2.

In general, the range of values is wider if the contact area has a greater extension or if the conditions of touch vary a lot from one contact to another.

Figure 5:
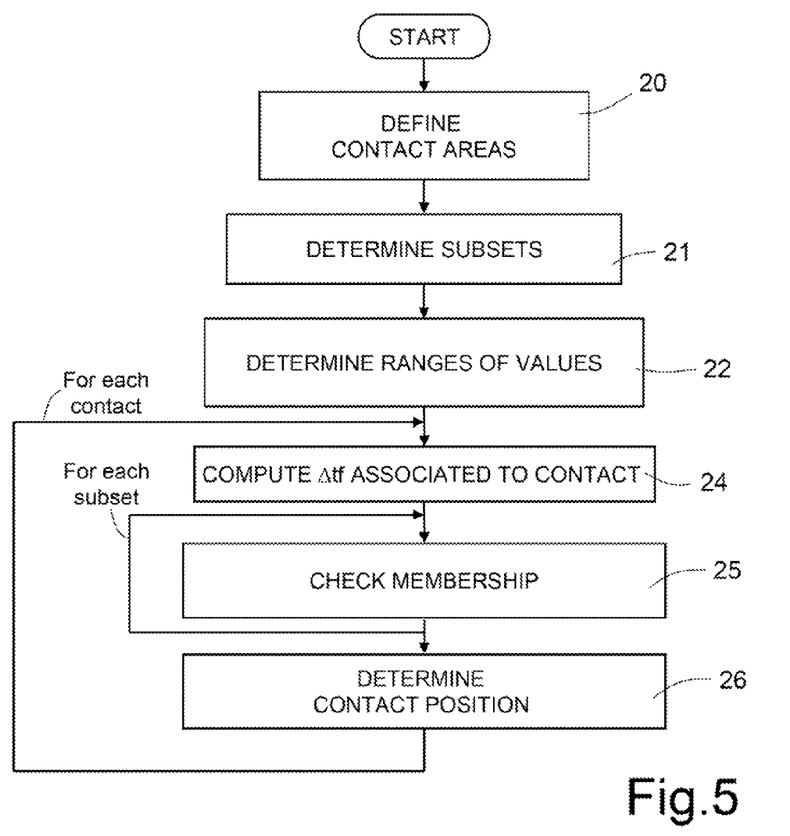
FIG. 5 is a flowchart regarding operations envisaged by an embodiment of a method for determining the position of contact.

With reference to FIG. 5, an embodiment hence envisages defining (step 20) a plurality of contact areas (or virtual keys) on one or both of the surfaces of the panel 2.

Next (step 21), for each contact area (via execution of a succession of touches in the same contact area) the time-of-flight differences Δtf that have a constant trend, and hence constitute, together, the respective subset of the same contact area are identified experimentally. It is noted that this subset is constituted by the set of the time-of-flight differences Δtf (or, alternatively, of the associated pairs of vibration sensors 4), analysis of which is significant for identification of a contact in the respective contact area; it is moreover noted that subsets associated with different contact areas may also coincide or have elements in common.

For each of these time-of-flight differences Δtf, a range of values of admissible variability is moreover determined (step 22), i.e., a range of values within which the same time-of-flight differences remain in the various successive touches. These ranges of values are stored in the memory 9, by being associated with the respective contact area and to the subset of time-of-flight differences Δtf to which they refer.

Next, during the effective use of the electronic device 1 by a user, an embodiment of a position detection method envisages that, at each detection of a contact on the panel 2, the determination stage 8 calculates the time-of-flight differences Δtf associated with the contact (step 24).

Then (step 25), for each contact area previously defined on the panel 2, the determination stage 8 retrieves from the memory 9 the time-of-flight differences Δtf of the associated subset, and the ranges of values associated thereto, and carries out a membership check. The determination stage 8 verifies whether the time-of-flight differences Δtf calculated for the detected contact fall within the respective ranges of values. In particular, it is determined whether the position of the contact falls within the contact area under examination (positive outcome of membership check) or not (negative check on membership). Then, the membership check is repeated iteratively for the other contact areas previously defined on the panel 2 and the respective subsets of time-of-flight differences Δtf.

If the membership check gives a positive result for a single subset of time-of-flight differences Δtf, the position where contact has been made is determined at the associated contact area (step 26).

If, instead, the membership check gives a positive result for two (or more) of the subsets of time-of-flight differences Δtf, or else in the case where the possibilities of membership check are exhausted without having obtained a positive result, a condition of indecision is instead identified and it is necessary to wait for a new contact (returning to step 24).

Figure 6:
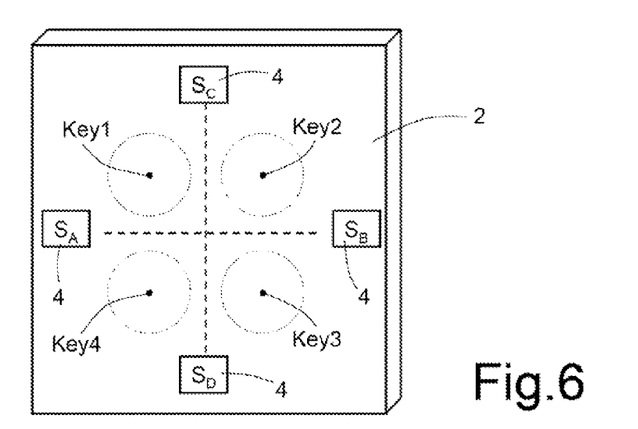
FIG. 6 is a schematic representation of an embodiment of a touch panel associated with the contact position determining system.

By way of example, assume that on the panel 2 four contact areas (FIG. 6) have been defined, designated as key1, key2, key3 and key4, and that four vibration sensors are present, the vibration signals of which are designated by $S_a$, $S_b$, $S_c$ and $S_d$ (the sensors being, for example, set at the vertices of a cross, in the proximity of the edges of the panel), and that there are two thresholds being considered ($c_1$ and $c_2$). Again by way of example, assume that it has been found experimentally that it is sufficient to consider a subset of six from among all the $\Delta T_{N,nt}$ time-of-flight differences to determine the position of a contact on the panel 2: $\Delta tf_1$, $\Delta tf_2$, $\Delta tf_3$, $\Delta tf_4$, $\Delta tf_5$, and $\Delta tf_6$ (the arrangement of the contact areas and their number, in general defined by keyn, the arrangement and number of vibration sensors, and the number of thresholds, may vary with respect to what is illustrated).

Figure 7:
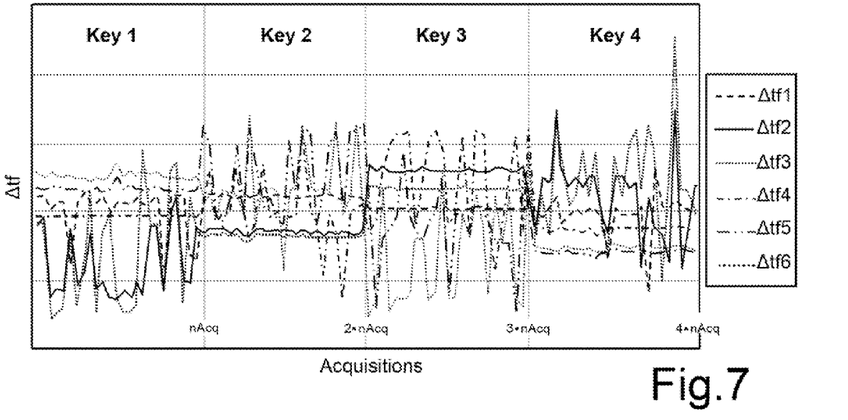
FIGS. 7-10 show the pattern of time-of-flight differences for successive contacts on an embodiment of the touch panel of FIG. 6.
Figure 8:
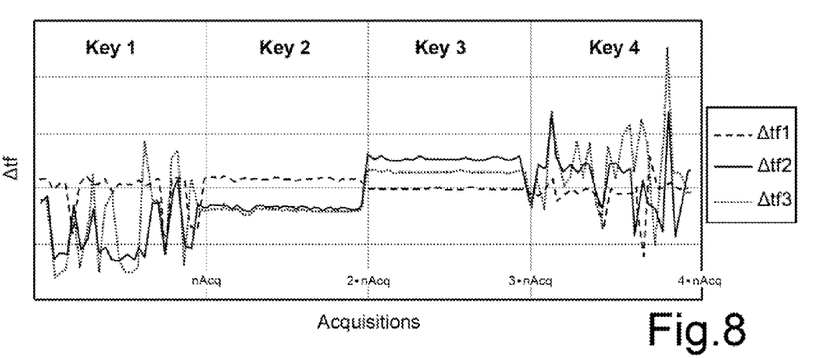
Figure 9:
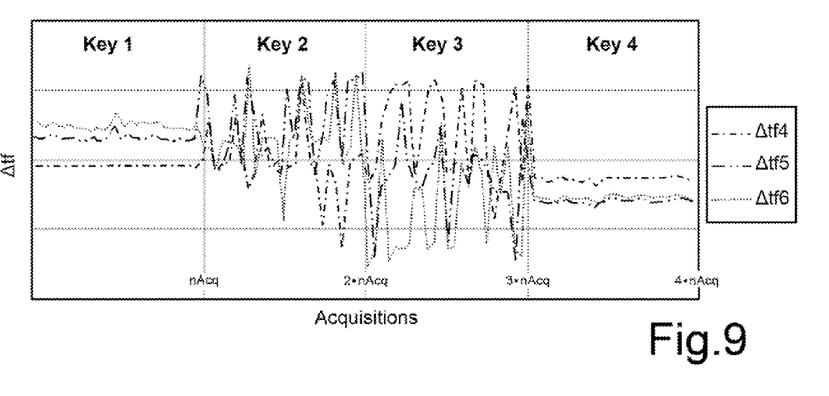

The diagrams of FIGS. 7-9 show the pattern of the aforesaid time-of-flight differences $\Delta tf_1$-$\Delta tf_6$ in the various consecutive acquisitions; note that for each contact area key1-key4 a number nAcq of acquisitions has been made, in each of which touching of the panel 2 has been made by the user with objects or using his/hers finger or hand.

From an examination of the diagrams, in this exemplary case, the presence of two subsets of time-of-flight differences Δtf emerge: a first subset, made up of the time-of-flight differences $\Delta tf_1$, $\Delta tf_2$, $\Delta tf_3$ characterizes the contact areas key2 and key3 (having values substantially constant for successive contacts occurring within these contact areas), but not the contact areas key1 and key4 (having values that are markedly different from one another in the course of the various acquisitions, without any constant trend), whilst a second subset, made up of the time-of-flight differences $\Delta tf_4$, $\Delta tf_5$, $\Delta tf_6$ characterizes, for similar reasons, the contact areas key1 and key4, but not the contact areas key2 and key3. Clearly, this situation is merely provided by way of example, and the case may also occur where a single subset is such as to characterize all the contact areas.

Figure 10:
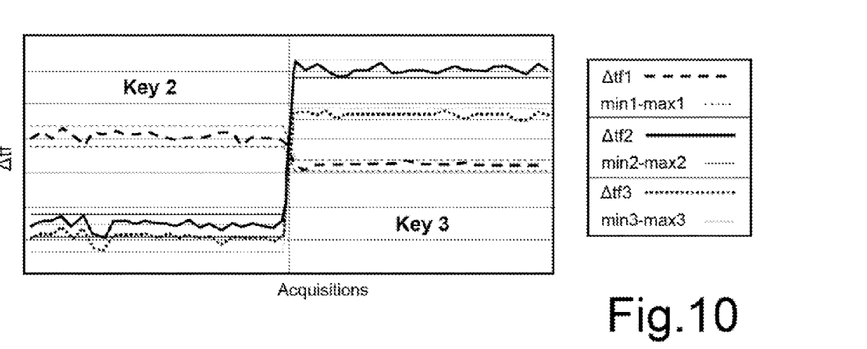

FIG. 10 shows, by way of example, only the time-of-flight differences $\Delta tf_1$, $\Delta tf_2$, $\Delta tf_3$, characterizing the contact areas key2 and key3, with the associated ranges of values of admissible variability, which define a range between respective minimum (min) and maximum (max) values within which the values of the time-of-flight differences are contained. As highlighted previously, during operation of the electronic device 1, it is hence sufficient for the determination stage 8 to verify that the time-of-flight differences $\Delta tf_1$, $\Delta tf_2$, $\Delta tf_3$ computed for the contact that has been detected on the panel 2 fall within these ranges of value, in order to determine that contact has occurred at the corresponding contact area key2 or key3. Note that, in the case of indecision (for example, in the case where the panel 2 is subject to an anomalous touch or contact), the determination stage 8 is configured to reject and not consider the touch or contact detected.

The method described previously involves determination of a significant instant at which the vibrations arrive at the various vibration sensors 4 (i.e. the time of flight), in such a way as to subsequently determine the various time-of-flight differences Δtf. One way to determine this instant, as indicated previously, is to verify the first occurrence of a threshold crossing (upwards or downwards) by the vibration signals generated by the vibration sensors 4 (the crossing indicating a variation with respect to a condition of rest for the same vibration signals).

It has, however, been found that, on account of disturbances of various natures (mechanical or electrical), it may happen that the first threshold crossing is due to a disturbance on the vibration signal and hence does not represent the significant instant for calculation of the time-of-flight differences Δtf.

An embodiment hence envisages removing the possible contributions of disturbance on the vibration signals, which could jeopardize proper determination of the time-of-flight differences Δtf. In particular, for this purpose there is proposed a reconstruction and filtering algorithm, which operates on the time-of-flight signals, i.e., on the pulse signals that are the result of the comparison between the vibration signals and the pre-set threshold or thresholds, in a step prior to determination of the times of flight and of the time-of-flight differences Δtf between the various vibration sensors 4. This algorithm is hence applied to the signals at output from the detection stage 7 and is implemented by the determination stage 8.

In general, an embodiment of the reconstruction step of the algorithm first of all envisages considering the first two pulses of each crossing signal: in the case where the temporal distance (gap) between the two pulses is less than or comparable to the duration of the same pulses, the two pulses are "united" and considered as a single pulse (first reconstructed pulse), which has an overall duration equal to the sum of the durations of the individual pulses and of the gap between the same pulses. Next, the reconstruction step of the algorithm envisages comparing, in a similar way, the pulse thus reconstructed with the subsequent pulse of the crossing signal (i.e., the third pulse of the original crossing signal), possibly executing a further unification. The first pulse, possibly reconstructed in this way, is used for the subsequent steps of the reconstruction and filtering algorithm.

Figure 11:
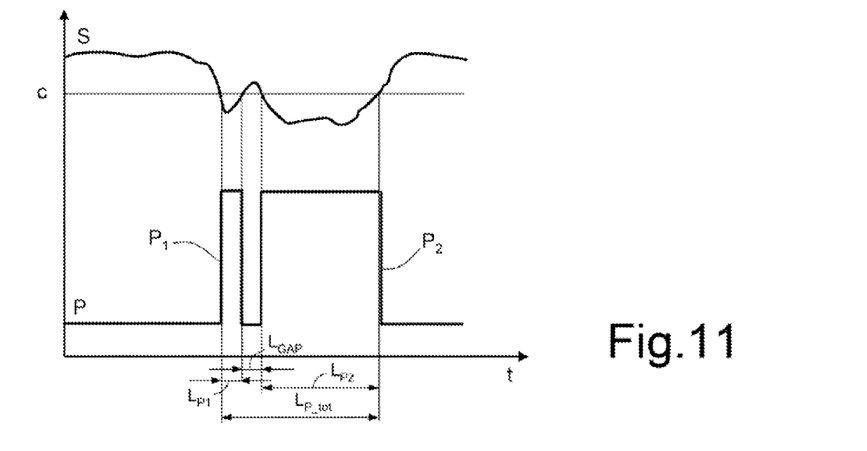
FIGS. 11 and 12 show the pattern of signals associated with a reconstruction and filtering algorithm implemented by an embodiment of a contact position determining system.

FIG. 11 illustrates an exemplary application of the reconstruction step applied to a generic vibration signal S.

The crossing signal P, which is the result of the comparison between the vibration signal S and a threshold c, has a first pulse $P_1$ and a second pulse $P_2$. The time gap ($L_{gap}$) between the two pulses is substantially equal to the width of one between the first pulse $P_1$ and the second pulse $P_2$ (in particular, to the width $L_{P1}$ of the first pulse $P_1$). Consequently, the two pulses are considered as a single pulse (first reconstructed pulse) having a total width $L_{P\_tot}$.

After the reconstruction step, an embodiment of the aforesaid reconstruction and filtering algorithm envisages a filtering step, in order to reject the (possibly reconstructed) pulses that are deemed not significant for determining the time of flight and the time-of-flight differences Δtf.

In general, this step of the algorithm envisages considering the first pulse of the reconstructed crossing signal associated with a given vibration sensor 4 as significant, unless at least one from between the subsequent pulse of the same signal and any one of the first pulses of the reconstructed waveforms associated with the other vibration sensors 4 has a greater width (note that the filtering step hence envisages considering and comparing the crossing signals associated with the various vibration sensors 4 with one another).

Figure 12:
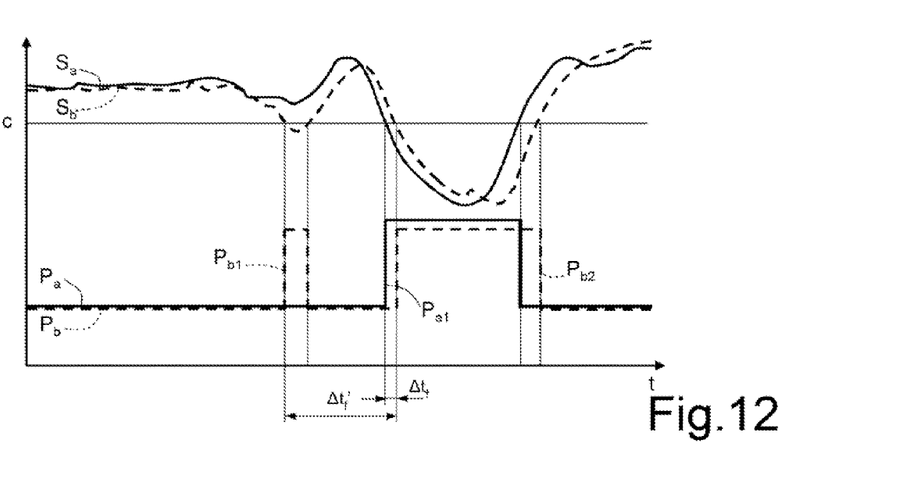

Illustrated in FIG. 12 is an exemplary application of the filtering step applied to two of the vibration signals (detected by two of the vibration sensors 4 of the contact position determining system 3), designated by $S_a$ and $S_b$. Designated by c in FIG. 4 is the threshold, common to the two vibration sensors 4, with respect to which the vibration signals $S_a$ and $S_b$ are compared, and designated by $P_a$ and $P_b$ are the resulting crossing signals.

The first pulse $P_{b1}$ of the crossing signal $P_b$ is rejected, its duration being shorter than the duration of the second pulse $P_{b2}$ of the same crossing signal $P_b$ or of the first pulse $P_{a1}$ of the crossing signal $P_a$ associated with the other vibration sensor 4. Consequently, the second pulse $P_{b2}$ of the crossing signal $P_b$ is effectively considered as the significant pulse based on which to calculate the time-of-flight difference Δtf between the two vibration sensors 4. The filtering step envisages comparing, in a similar way, the (remaining) pulse with the subsequent pulse of the crossing signal (i.e., the third pulse of the original crossing signal), possibly performing, if necessary, a further operation of rejection.

Note that the case represented in FIG. 12 corresponds to a situation in which the touch on the panel 2 occurs in a position substantially equidistant with respect to the two vibration sensors 4 so that the resulting time-of-flight difference between the two vibration sensors 4 is approximately zero. However, on account of the oscillation due to the contribution of disturbance, a first spurious pulse $P_{b1}$ is generated in crossing signal $P_b$, which would lead to determining a time-of-flight difference, designated by Δtf' in FIG. 12, of a wrong value. Application of the filtering step of the reconstruction and filtering algorithm allows removing the contribution of disturbance and affects considering, for determination of the time of flight (and of the time-of-flight differences), only the effectively significant pulses: in the specific case illustrated in FIG. 12, by applying the algorithm we obtain in fact a time-of-flight difference Δtf that is substantially zero, corresponding to the real situation.

In greater detail, according to an embodiment, the reconstruction and filtering algorithm envisages execution of the following checks by the determination stage 8, on the crossing signals P received at input.

In the reconstruction step, for each crossing signal $P_a$ associated with a given vibration sensor 4, the following two conditions are evaluated:

$$L_{Pa1} << L_{Pa2}; \text{ and}$$

$$L_{gap} \leq \min(L_{Pa1}, L_{Pa2}),$$

where $L_{Pa1}$ and $L_{Pa2}$ are the widths respectively of the first and second pulses of the crossing signal $P_a$, and $L_{gap}$ is the time gap between the aforesaid first and second pulses of the crossing signal $P_a$.

If both of the conditions are satisfied (for example, because $L_{Pa2}$ is greater than twice $L_{Pa1}$, and $L_{gap}$ is smaller than $L_{Pa1}$), the first two pulses of the crossing signal $P_a$ are united and considered as a single resulting pulse having width $L_{P\_tot}$:

$$L_{P\_tot} = L_{Pa1} + L_{Pa2} + L_{gap}$$

The reconstruction algorithm envisages that the same checks are repeated iteratively for this resulting pulse and the subsequent pulse of the same crossing signal $P_a$ (the third pulse of the original signal). Furthermore, the same checks are applied iteratively for the crossing signals of each of the other vibration sensors 4, up to completion of the reconstruction of the various crossing signals.

In the filtering step, subsequent to the reconstruction step, for each crossing signal $P_a$ (possibly reconstructed in the preceding step of the algorithm) associated to a given vibration sensor 4, the following two conditions are evaluated:

$$L_{Pa1} << L_{Pa2}, L_{Pb}), \text{ and}$$

$$L_{gap} >> \min(L_{Pa1}, L_{Pa2}, L_{Pb})$$

where $L_{Pb}$ is the smallest of the widths of the first pulses of the crossing signals associated with the other vibration sensors 4.

If these conditions are both satisfied (i.e., $L_{Pa1}$ is much smaller than at least one between $L_{Pa2}$ and $L_{Pb}$, and $L_{gap}$ is much greater than the minimum between $L_{Pa1}$, $L_{Pa2}$ and $L_{Pb}$), the first pulse of the crossing signal $P_a$ is rejected and not considered for calculation of the time-of-flight differences Δtf.

Again, the filtering algorithm is executed for the subsequent pulse of the same crossing signal $P_a$ (the third pulse of the original signal), and then iteratively for the crossing signals of all the vibration sensors 4, of course not considering the first pulses of the crossing signals already rejected by the algorithm.

Note that the use of this reconstruction and filtering algorithm may be particularly useful in combination with a method for determining the position of contact described previously (for example, with reference to FIG. 5) in so far as it enables a greater precision and insensitivity to disturbance in determination of the time-of-flight differences Δtf and hence enables a synergistic effect in the improvement of the performance as regards determination of the position of a contact on the panel.

However, an embodiment of the reconstruction and filtering algorithm may prove per-se useful for improving the precision in detecting the position of contact, also in combination with traditional position-detection techniques (for example, in combination with the hyperbola method discussed with reference to the known art), hence constituting a procedure preliminary to a generic algorithm for determining the position of contact based on processing of time-of-flight differences Δtf.

Likewise, an embodiment of a method for determining the position of contact described previously may not envisage a preventive step of reconstruction and filtering of the crossing signals associated with the vibration signals, or else may envisage a different mode for removal of disturbances possibly present on the vibration signals.

Advantages of an embodiment of a method and an embodiment of a system for determining the position of contact are clear from the foregoing description.

In any case, such embodiments may enable a higher reliability in determination of the position of the contacts on a panel to be obtained, also in the case where it has a non-homogeneous and irregular surface and in the case where disturbances of various nature are present. In particular, the joint use of an embodiment of a method for determining the position of contact and of an embodiment of a reconstruction and filtering algorithm may enable a synergistic advantage in improvement of the performance to be obtained.

Furthermore, a system for determining the position of the contacts may be simplified with respect to traditional solutions and may be less expensive to provide. In particular, it may not involve complex and costly additional manufacturing steps in so far as the vibration sensors 4 may be applied in a simple way at the end of the manufacturing process of any electronic device equipped with a touch panel, without, for example, the need for the presence and provision of additional electrodes and/or wires on the active area of the panel.

Furthermore, once the vibration sensors are fixed on the panel, it may be possible to modify the position and the number of the keys (or contact areas) to be recognized by simply modifying the configuration of the processing circuit 6 (acting, for example, only on the firmware of the corresponding microcontroller), without modifying either the process for production of the panel or the positioning of the sensors. Consequently, with a single production process, it may be possible to provide different operating panels, i.e., panels with different key arrangements, to which different functions of the corresponding electronic device may correspond.

The use of a plurality of thresholds (for example, two in number, one higher and one lower than the output level in the absence of vibrations) to determine the times of flight and the time-of-flight differences Δtf may enable a greater precision and robustness of an embodiment of a method to be obtained in given operating situations (for example, in the case where overlying contact areas are present on the two faces of the panel 2).

Finally, it is clear that modifications and variations may be made to what has been described and illustrated herein, without thereby departing from the scope of the present disclosure.

In particular, the vibration sensors 4 may be microphones, or piezoelectric sensors, instead of accelerometer sensors, or in general movement sensors that are able to detect the presence of the vibrations generated by the contact on the surface of the panel 2.

An embodiment of the method and an embodiment of system described may be applied advantageously in numerous applications and with a wide range of materials of the panel 2, such as glass (for example, in sliding doors, fans, shower booths, or automatic vending machines), metal (for example in automatic teller machines or electrical household appliances), or plastic (for example in toys, or small or medium-sized electrical household appliances). More in general, a method and system may find advantageous application in all devices and apparatuses envisaging the use of a panel on which function keys (or similar operating/control elements) are implemented.

An embodiment of the reconstruction and filtering algorithm may be modified for considering, during the comparison operations, a larger number of consecutive pulses (for example, higher than three) of the crossing signals generated starting from the vibration signals, in order to improve further the robustness to disturbances, in the case where the environmental conditions may so require.

Furthermore, an embodiment of a system for determining the position of contact may be obtained entirely via firmware by a microprocessor or microcontroller (or similar processing units). In this case, a direct connection may be provided between the outputs of the vibration sensors 4 and the input (digital, or for analog-to-digital conversion) of the microprocessor/microcontroller. Alternatively, a system can be made, at least in part (in particular, as regards the detection stage 7), with analog components.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method, comprising:
   detecting signals at sensors;
   calculating a first duration between two first consecutive crossings of a threshold by a first signal;
   calculating a second duration between two second consecutive crossings of the threshold by the first signal, the two second consecutive crossings subsequent to the two first consecutive crossings;
   calculating a third duration between the last of the first consecutive crossings and the first of the second consecutive crossings;
   calculating a fourth duration between two first consecutive crossings of the threshold by a second signal; and identifying the first of the two second consecutive crossings as being suitable for use in a calculation in response to the first duration being smaller than the second and fourth durations and the third duration being greater than a smallest one of the first, second, and fourth durations.

2. The method of claim 1, wherein the detecting signals further comprises detecting a contact on a touch screen with a plurality of vibration sensitive sensors.

3. The method of claim 1, further comprising identifying a region of a touch screen corresponding to an origin of contact in response to suitable crossings.

4. The method of claim 1, further comprising identifying the first of the two second consecutive crossings as being not suitable for use in a calculation in response to the first duration being greater than the second and fourth durations or the third duration being less than a smallest one of the first, second, and fourth durations.

5. A method, comprising:
calculating a first duration between two consecutive first crossings of a first threshold by a first signal;
calculating a second duration between the two consecutive second crossings of the first threshold by the first signal, the second crossings subsequent to the first crossings;
calculating a third duration between the second of the second crossings and a third crossing of the first threshold by the first signal, the third crossing subsequent to the second crossings;
calculating a first time difference between a third time at which a detector detects the first signal crossing the first threshold and a fourth time at which the detector detects the second signal crossing the second threshold and to identify the region of the device in response to the second time difference; and
identifying the third subsequent crossing as being suitable for use in a calculation in response to the first duration being less than the third duration and the second duration being less than or equal to the smallest of the first and third durations.

6. A circuit comprising:
a detection stage configured to detect signals generated by a plurality of contact sensors based upon respective detected contact; and
a determination stage coupled with said detection stage and configured to
calculate a first duration between two first consecutive crossings of a threshold by a first signal;
calculate a second duration between two second consecutive crossings of the threshold by the first signal, the two second consecutive crossings subsequent to the two first consecutive crossings;
calculate a third duration between the last of the first consecutive crossings and the first of the second consecutive crossings;
calculate a fourth duration between two first consecutive crossings of the threshold by a second signal; and
identify the first of the two second consecutive crossings as being suitable for use in a calculation in response to the first duration being smaller than the second and fourth durations and the third duration being greater than a smallest one of the first, second, and fourth durations.

7. The circuit of claim 6 wherein the plurality of contact sensors comprises a plurality of vibration sensitive sensors associated with a touch screen.

8. The circuit of claim 7 wherein said determination stage is further configured to identify a region of the touch screen corresponding to an origin of contact in response to suitable crossings.

9. The circuit of claim 6 wherein said determination stage is configured to identify the first of the two second consecutive crossings as being not suitable for use in a calculation in response to the first duration being greater than the second and fourth durations or the third duration being less than a smallest one of the first, second, and fourth durations.

10. A system comprising:
a plurality of contact sensors configured to generate signals based upon respective detected contact; and
a processor coupled to said plurality of contact sensors and configured to
detect the signals from said plurality of contact sensors,
calculate a first duration between two first consecutive crossings of a threshold by a first signal,
calculate a second duration between two second consecutive crossings of the threshold by the first signal, the two second consecutive crossings subsequent to the two first consecutive crossings,
calculate a third duration between the last of the first consecutive crossings and the first of the second consecutive crossings,
calculate a fourth duration between two first consecutive crossings of the threshold by a second signal, and
identify the first of the two second consecutive crossings as being suitable for use in a calculation in response to the first duration being smaller than the second and fourth durations and the third duration being greater than a smallest one of the first, second, and fourth durations.

11. The system of claim 10 further comprising a touch screen; and wherein said plurality of contact sensors comprises a plurality of vibration sensitive sensors associated with said touch screen.

12. The system of claim 11 wherein processor is further configured to identify a region of the touch screen corresponding to an origin of contact in response to suitable crossings.

13. The system of claim 10 wherein said processor is configured to identify the first of the two second consecutive crossings as being not suitable for use in a calculation in response to the first duration being greater than the second and fourth durations or the third duration being less than a smallest one of the first, second, and fourth durations.

* * * * *